Nov. 22, 1932.  G. D. GOULD  1,888,723
LAMP SUPPORTING DEVICE
Filed Feb. 1, 1932
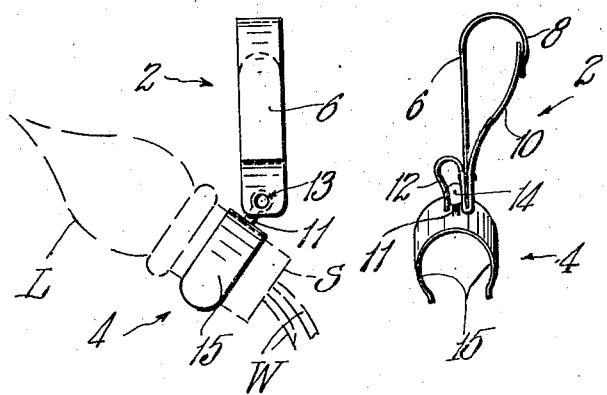
INVENTOR.
George D. Gould
BY Walter C Ross
ATTORNEY.

Patented Nov. 22, 1932

1,888,723

UNITED STATES PATENT OFFICE

GEORGE D. GOULD, OF CHICOPEE, MASSACHUSETTS

LAMP SUPPORTING DEVICE

Application filed February 1, 1932. Serial No. 590,031.

This invention relates to improvements in devices for supporting lamp sockets and is directed more particularly to devices for attaching lamp sockets to Christmas trees and the like.

The principal objects of the invention are directed to an electric light socket supporting device which is adapted and arranged for hanging on the branches of Christmas trees and the like. By reason of its novel construction and form the device is adjustable so that a lamp socket may be held thereby in various positions of adjustment.

Various novel features and advantages of the invention will be more fully hereinafter referred to in connection with the accompanying description of the preferred form of the invention which for purposes of disclosure is shown in the accompanying drawing wherein:

Fig. 1 is a front elevational view of a lamp supporting device embodying the novel features of the invention, and Fig. 2 is a side elevational view of the same.

Referring to the drawing in detail the invention will be described.

In general the lamp supporting device of the invention includes an attaching member 2 and a lamp socket receiver 4. Each of these is of novel form and they are connected together in a novel manner as will hereinafter more fully appear.

The member 2 includes an upwardly extending main body portion 6, the extremity 8 of which is turned away therefrom and downwardly to form a hook as shown and a member 10 which extends upwardly from the lower end at one side of the member 6 and outwardly so as to lie adjacent the inner side of the member 8.

The parts described are preferably made from relatively thin springlike metallic material and are formed so that the member 10 tends to yieldingly press against the member 8. That is the members are yieldable so that an object such as the branch of a tree may be embraced in a yielding manner between the parts 8 and 10, or of course the part 6 may be hooked onto an object.

A socket loop 12 at the opposite side of the member 6 is formed by bending a suitable strip as shown and will preferably be of springlike material so as to yieldingly embrace a ball member 14.

This member 12 in its outer side may have an opening 13 to receive the ball 14. This opening may be called a socket and a similar socket may be provided in the inner side of the loop 12.

As shown in the drawing the members 12 and 10 may be joined together to embrace the lower end of the member 6, and the parts may be riveted or otherwise secured together. If desired the members 6 and 10 may be joined with the member 12 riveted thereto.

Any convenient method of making the parts may be employed in order that the member 10 may be yieldable relative to the member 8 while a loop 12 is yieldable or resilient to yieldingly embrace the ball 14.

The socket member 4 is preferably made of substantially flat, springlike material which is bent to form a semi-circle 15 and is joined to the ball 14 by means of a shank 11.

Since the ball 14 is yieldingly embraced by the member 12 the member 4 may be swung into various positions of adjustment with reference to the member 2. It will be held in all ordinary positions by means of the yieldable member described.

In practice the hook member 2 may be hung on the branch of a tree while a lamp socket such as S may be snapped into the member 4 for supporting a light L as indicated by dash lines.

It is possible to employ a plurality of the devices which have been described and it is an easy matter to support various sockets of a lighting set which are usually wired together. Because of the adjustability of the device, the sockets and their lights may be supported in various angular positions.

The device is simple in form and economical to manufacture and by reason of its adjustability it is adapted for the general use whenever it is desired to support a lamp socket.

What I desire to claim and secure by Letters Patent of the United States is:

The combination in a device of the class described of, an attaching unit and a lamp socket receiving unit arranged for relative swinging movements, said attaching unit including a body member having a lower portion and a portion extending upwardly therefrom the extremity of which is turned outwardly and then downwardly to form a curving hook, a member having a lower portion contiguous to one side of the lower portion of the body member and a free end portion extending upwardly and outwardly therefrom the extremity of which yieldingly bears against the inner side of said hook and another spring-like loop-member having a lower portion contiguous to the other side of the lower portion of the body member and a free-end portion which is bent outwardly and downwardly from said lower portion to form with said lower portion a loop having relatively yieldable spaced sides and the inner faces of said sides being provided with sockets for receiving a ball member therebetween, the lower contiguous portions of said members being secured together, said lamp socket receiving member having relatively yieldable spaced socket embracing arms and a ball attached thereto which is receivable in the sockets of said loop member.

In testimony whereof I affix my signature.

GEORGE D. GOULD.